10

United States Patent Office 3,296,236
Patented Jan. 3, 1967

3,296,236
PRODUCTION OF GRANULAR POLYVINYL
ALCOHOL
Walton B. Tanner, Grand Island, N.Y., assignor to E. I. du Pont de Nemours and Company, Wilmington, Del., a corporation of Delaware
No Drawing. Filed May 31, 1962, Ser. No. 198,721
8 Claims. (Cl. 260—91.3)

This invention relates to the production of polyvinyl alcohol by the alcoholysis of a polyvinyl ester, in particular to an improved process for the continuous production of polyvinyl alcohol.

The preparation of polyvinyl alcohol by the acid or alkali-catalyzed alcoholysis of a polyvinyl ester such as polyvinyl acetate in a hydrolytic alcohol such as methanol is well known. The patent literature describes a number of processes, both batch and continuous, which are adaptable to the commercial production of polyvinyl alcohol. One method which is advantageous from the standpoints of economical operation, high production rates, good product quality and ease of control is described in U.S. Patent 2,734,048, issued February 7, 1956. This patent describes a continuous process for the production of polyvinyl alcohol in which a solution of polyvinyl acetate in methanol is continuously added to an agitated alcoholysis mixture and a slurry of polyvinyl alcohol in a methanol-methyl acetate solvent mixture is continuously removed from the alcoholysis mixture. The concentration of sodium methylate catalyst in the alcoholysis mixture is maintained at a level sufficient to give rapid alcoholysis, e.g. 0.15–0.5% based on the alcoholysis mixture, by periodic or continuous addition of a methanol solution of sodium methylate. By maintaining the rate of continuous addition of polyvinyl acetate solution at such a level that the concentration of solvent-soluble polyvinyl acetate, that is polyvinyl acetate with 0% to about 45% of the acetate groups replaced by hydroxyl groups, does not exceed about 1% of the alcoholysis mixture, undesirable gel formation is avoided and accordingly heavy mixing equipment and large input of power are not required. A strong gel structure may form and the entire alcoholysis mixture may set-up to a motionless mass if the concentration of the solvent-soluble polyvinyl acetate exceeds 1%, especially if it exceeds 5%. This strong gel is typically produced at an intermediate stage of replacement of acetate groups by hydroxyl groups in batch alcoholysis of polyvinyl acetate solutions containing 5% or more polyvinyl acetate. Powerful mixing equipment, e.g. a kneader, has been commonly used if it is desired to agitate an alcoholysis mixture while it is in a strong gel phase and thereby comminute it so as to obtain a particulate product.

The process of U.S. Patent 2,734,048 avoids the requirement for heavy mixing equipment by maintaining the solvent-soluble polyvinyl acetate at such a low level that a dilute, and therefore weak and readily comminuted, gel structure is formed. Because of the inherent nature of the gel structure which is formed, however, even mild agitation comminutes it to small particles and, since the gel is so dilute, the particles undergo considerable size reduction on loss of methanol-methyl acetate by syneresis from the gel. As a result, the process of U.S. Patent 2,734,048 tends to produce a product which consists predominantly of particles having diameters in the range of 3 to 15 microns. While for many applications polyvinyl alcohol with this small particle size is very advantageous, material of this type tends to be dusty and causes certain inconveniences in handling and use.

It is an object of this invention to provide a process for the production of a non-dusty, granular polyvinyl alcohol. Another object is a process for the production of granular polyvinyl alcohol which process has a low power requirement. A further object is a continuous, easily controlled process for the production of granular polyvinyl alcohol.

These and other objects are attained by operating within the general framework of the process described in U.S. Patent 2,734,048 but with the critical modification that at least a part of the solution of polyvinyl ester in the hydrolytic alcohol must be added to the alcoholysis mixture in intermittent portions. These intermittent portions must be of such a size that, when each portion has been alcoholized as a batch to the point where it is in the gel phase and during the time that portion is in the gel phase, the gel structure will cause the alcoholysis mixture to thicken. This thickened condition of the alcoholysis mixture will require increased power to agitate the mixture. Thus by monitoring the power requirements for agitating the alcoholysis mixture, it can be readily determined if the mixture is in a thickened state. It is also necessary that the time interval between feeding successive intermittent portions is sufficient for the alcoholysis mixture to revert to a non-thickened condition after each portion passes through the gel phase and before the next succeeding portion passes into the gel phase. By non-thickened is meant that condition of fluidity of the alcoholysis mixture which is the same as that obtained with an alcoholysis mixture having the same temperature, percentage of polyvinyl alcohol solids and composition of the liquid phase but being fed continuously at a rate, e.g. according to U.S. Patent 2,734,048, which yields a very dilute, weak gel structure. In terms of the measurable power requirements for agitation of the alcoholysis mixture, the time interval between feeding the succeeding intermittent portions should be sufficient for the power requirements to decrease to a markedly lower base power load between intervals of increased power requirements as the individual intermittent portions pass through the gel phase. By base power load is meant the characteristic power requirement for agitation of a non-thickened alcoholysis mixture, the absolute value of the base power load being a characteristic of the specific alcoholysis system being used and therefore dependent on the size and shape of the alcoholysis vessel, the speed of rotation and dimensions of the agitator, and the volume and composition of the alcoholysis mixture.

For optimum improvement of the particle size of the polyvinyl alcohol, it is preferred that all of the polyvinyl ester solution be fed to the alcoholysis mixture in intermittent portions and that the time required to feed the individual portions be as short as possible. Under these conditions, the time between intervals of feeding polymer solution may be ten or more times greater than the actual feeding time. A further preferred mode of operation involves having the time interval between feeding the individual portions not less than the sum of (1) the time required to feed an individual portion and (2) the time during which an individual portion is in the gel phase.

Operation in this manner assures that there will be no overlapping of the individual intermittent portions in the gel phase. This is desirable since with too great overlapping, the process can degenerate into continuous operation in the thickened condition and finally to a set-up alcoholysis mixture.

Equipment limitations and difficulties in rapid pumping or transfer of viscous polyvinyl ester solutions combined with the requirement of economical commercial operation may require some compromise with these conditions which are preferred from the viewpoint of producing optimum particle size. It has been found that valuable improvement of the particle size is obtained as long as the amount of polymer solution fed in intermittent portions and the time interval between feeding the intermittent portions are sufficient to give discrete, detectable periods during which the alcoholysis mixture is in a thickened condition. It is possible, for example, to obtain a significant improvement in particle size by operation with 40% of the polyvinyl ester solution being fed as a continuous stream to the alcoholysis mixture and the remaining 60% being superimposed as an intermittent feed with the overall time between intervals of feeding the intermittent portions being only slightly (e.g. about 1.2 times) greater than the time to feed the intermittent portions.

The absolute size of the intermittent portions and the time intervals between feeding these portions cannot be spelled out for all combinations of operating conditions because they are dependent on (1) the dimensions of the alcoholysis vessel, (2) the time required for the polyvinyl ester to alcoholize to its gelation stage and (3) the time the partially alcoholized polyvinyl ester is in the gelation stage. The latter two factors, which involve the rate of the alcoholysis reaction, are dependent on the temperature of alcoholysis, the catalyst concentration and type, the polyvinyl ester concentration and type, the hydrolytic alcohol concentration and type, and the composition of the liquid portion of the alcoholysis mixture. Since so many interdependent factors affect the absolute size and spacing of the intermittent portions of polyvinyl ester solution, the invention will be further described by showing how these factors affect the alcoholysis and by giving specific examples of operation under this invention. With this information, the person skilled in the art of polyvinyl ester alcoholysis can readily determine the operating conditions required with his specific alcoholysis vessel and alcoholysis composition to obtain particle size improvement according to this invention.

Polyvinyl alcohol can be produced by the alcoholysis of a number of polyvinyl esters, for example, polyvinyl formate, polyvinyl acetate, polyvinyl propionate, polyvinyl butyrate, etc., but for reasons of economy, ready availability and excellent performance, polyvinyl acetate is used almost exclusively. The hydrolytic alcohols which can be used for reaction with the polyvinyl ester to produce polyvinyl alcohol and by-product liquid ester include methanol, ethanol, the isomeric propanols, the monomethyl ether of ethylene glycol, etc., but again for reasons of economy and performance, methanol is the preferred alcohol. It is well known that the by-product liquid ester obtained from the alcoholysis of a polyvinyl ester is the ester of the hydrolytic alcohol with the acid residue of the polyvinyl ester. Thus methyl acetate is obtained when the preferred polyvinyl acetate and methanol are used. Both acid and alkaline catalysts can be used for the alcoholysis of polyvinyl esters. Examples of suitable acids are sulfuric acid, hydrogen chloride, and p-toluene sulfonic acid. Alkaline catalysts generally give more rapid rates of alcoholysis and accordingly they are preferred for use in this invention. Alkali metal hydroxides and alcoholates are especially useful alkaline catalysts. Both types of materials can be used at alcoholysis temperatures below about 40° C. but above that temperature, the alkali metal hydroxides react with the polyvinyl ester or the by-product liquid ester by saponification thus destroying their catalytic activity. Accordingly at temperatures above about 40° C., the alkali metal alcoholates, in particular, sodium methylate, are preferred.

The following discussion and examples will be restricted to the preferred composition, that is, polyvinyl acetate as the polyvinyl ester, methanol as the hydrolytic alcohol, and sodium methylate as catalyst. It will be understood that if a different polyvinyl ester, hydrolytic alcohol or catalyst is used, similar considerations will apply and the process of this invention will be applicable, the only requirement being that the alcoholysis system yields a thickened alcoholysis mixture due to gelation of the polyvinyl ester at an intermediate stage of alcoholysis.

The process of this invention can operate with a concentration of polyvinyl acetate in the polymer solution being fed to the alcoholysis mixture as low as about 5%. However, this requires the use of very large vessels and much solvent recycle to obtain high production rates. Moreover, while the use of so dilute a feed in this process will give a granulated product, the product will be of relatively low bulk density. For reasons of economy and quality, it is preferred to operate with a polyvinyl acetate feed of at least 30% by weight in a methanol solution. The upper limit of concentration is not set by considerations involving granule production but by alcoholysis rate. A feed mixture of 73% polyvinyl acetate-27% methanol contains the stoichiometric quantity of methanol required for complete alcoholysis of the polyvinyl acetate. At this concentration, however, the rate of alcoholysis during the last 10% of alcoholysis (from 90 to 100% replacement of acetate by hydroxyl groups) is impractically slow. To obtain a practical overall rate of alcoholysis, the methanol content of the solvent phase of the alcoholysis mixture should be at least 20%. A feed of 63% polyvinyl acetate-37% methanol will yield a polyvinyl alcohol slurry in a methanol-methyl acetate solvent mixture containing 20% methanol, thus a 63% polyvinyl acetate solution represents the maximum practical concentration of the polymer feed. This also represents the maximum practical concentration of polyvinyl acetate for another reason, namely to obtain a polyvinyl alcohol slurry which is free-flowing and which contains sufficient free solvent to permit ready dispersion of the concentrated polyvinyl acetate solution being added.

The methyl acetate concentration in the solvent phase of the alcoholysis mixture is of considerable importance in this invention since it (1) determines the extent of alcoholysis at the time the polymer enters and leaves the gel phase, (2) affects the strength of the gel structure, (3) has an effect on the distribution of alkaline catalyst between the solid and liquid phases of the alcoholysis mixture, and (4) has an effect on the density of the polyvinyl alcohol product. Increased methyl acetate concentration causes gelation to begin and end at lower degrees of alcoholysis, to decrease the strength of the gel, to increase the catalyst concentration in the solid phase at the expense of the concentration in the liquid phase of the alcoholysis mixture and to increase product density. The methyl acetate content is normally fixed by the polyvinyl acetate solids in the feed but may be altered by the addition of liquid methyl acetate to the alcoholysis mixture. Since improved product quality is obtained at high methyl acetate content, this provides the incentive either to use high polyvinyl acetate solids in the feed or to add methyl acetate to the alcoholysis mixture. The practical upper limit on the methyl acetate content is that amount which lowers the methanol concentration below 20% in the liquid phase of the alcoholysis mixture. In a typical alcoholysis in which the feed is 35% polyvinyl acetate-65% methanol, the alcoholysis mixture will consist of about an 18% slurry of polyvinyl alcohol in a 63% methanol-37% methyl acetate solvent mixture. With this solvent composition, the polymer will enter the gel phase at about 45% alcoholysis and will leave the gel phase at about 75–80% alcoholysis.

Two factors which affect the rate of alcoholysis are the catalyst concentration and the temperature. At an alcoholysis temperature of 55° C., the practical upper limit of average alkalinity in the alcoholysis mixture corresponds to about 0.8% sodium methylate. Above this concentration, alcoholysis of a concentrated polyvinyl acetate feed will occur before the polymer solution can be dispersed. The upper limit on alkalinity can be raised if the temperature is lowered, for example to 20° C. In general, catalytic activity is approximately halved for every 10° C. drop in temperature. Since increased catalyst concentration may lead to contamination of the product polyvinyl alcohol with inorganic material (e.g. sodium acetate), it is generally preferred to operate at temperatures in the range of 45–60° C. where unduly high catalyst concentrations are not required for adequate alcoholysis rates. These temperatures are also preferred for simplicity of operation since the liquid phase of the alcoholysis mixture ordinarily boils in the range of 58–63° C. at atmospheric pressure. Temperatures up to 100° C. or more can be used by operation under pressure. These elevated temperatures can be used to lower the minimum practical catalyst concentration or to allow the use of higher methyl acetate content.

On the lower side of alkalinity, the granulation process of this invention will operate with a trace of alkali, but the production rate will be very low. For practical and economical production rates, the lower limit is 0.05% sodium methylate at a 55° C. alcoholysis temperature. The preferred catalyst concentration is 0.1 to 0.5% sodium methylate when operating in the preferred 45–60° C. temperature range.

It is preferred that the rate of feeding the individual intermittent portions of polyvinyl acetate solution be very high so that the time required to feed the portions is as short as possible. However, any system in which the feed rate on occasion is raised high enough and maintained long enough to obtain a discontinuous power rise will yield a granular product. In any case the rate of feeding the intermittent portions of polyvinyl acetate solution must be sufficiently high so that if the alcoholysis vessel were fed at that rate continuously, it would set-up to a non-moving, gelled mass. The intermittent feeding process avoids a set-up vessel because each individual portion passes through the gel phase before the next succeeding portion arrives at the gel phase. Thus the gel from one portion does not reinforce the gel in the previous portion and set-up of the alcoholysis mixture is avoided, even though each portion does cause thickening of the alcoholysis mixture. If, however, the intermittent portions are fed too close together so that the gel from one portion can reinforce the gel from the preceding portion, then the alcoholysis mixture can readily degenerate into a continuously thickened condition and finally set-up to a solid, gelled non-moving mass. Care should be taken to avoid this set-up condition because it will require that the equipment be shut down while the solid material is removed manually or by other laborious methods.

One method of operating the granulation process of this invention is to allow each intermittent portion to pass into and out of the gel phase before the next portion is added. In order to obtain high production rates by this method it is necessary to use large working volumes and/or high catalyst concentration to obtain rapid rates of alcoholysis. Complete separation of the intermittent portions in this manner is not necessary, however, and some degree of overlapping of the intermittent portions is practical. This refers to overlapping of the portions in the solvent-soluble stage only and not in the gel stage. That such overlapping is possible in the solvent-soluble stage while not carrying over into the gel stage is due to the difference in alcoholysis rates in these two stages, in particular to the much more rapid alcoholysis from about 45 to about 80% in the gel stage as compared to the 0 to about 45% alcoholysis in the solvent-soluble stage. This more rapid alcoholysis is due to the preference of the sodium methylate catalyst to concentrate in the solid phase. As the methyl acetate content of the solvent phase is increased, the catalyst preference for the solid phase is increased. As the total catalyst concentration is lowered, the preference for the solid phase is increased again. These facts are illustrated by the following experimental data:

| Percent Methyl Acetate in Solvent | A | B | Ratio, B/A |
|---|---|---|---|
| | Conc. (Percent) of Catalyst in Liquid Phase | Conc. (Percent) of Catalyst in Solid Phase | |
| 35 | 0.05 | 0.55 | 11/1 |
| 35 | 0.3 | 1.0 | 3.3/1 |
| 45 | 0.05 | 0.70 | 14/1 |
| 45 | 0.3 | 1.4 | 4.7/1 |

The approximate times of alcoholysis to the gel phase and in the gel phase when a 35% polyvinyl acetate-65% methanol feed is added to an alcoholysis mixture at 55° C. in a steady operating condition and containing about 18% polyvinyl alcohol in a solvent mixture of 63% methanol-37% methyl acetate are shown below:

| Percent NaOCH$_3$ in Alcoholysis Mixture | Time to Reach Gel Phase, minutes | Time in Gel Phase, seconds |
|---|---|---|
| 0.2 | 20 | 45 |
| 0.4 | 2 | 30 |

From the foregoing, it will be apparent that if, for example, a 5 second feeding interval is used for the addition of the intermittent portions, the minimum time intervals between feeding the intermittent portions will be 50 seconds and 35 seconds for the 0.2% and 0.4% catalyst concentrations, respectively, in order to be certain of no overlapping of the portions in the gel phase in accordance with a preferred mode of operation. Thus it would be possible to have about 20 overlaps of dissolved polymer portions in the alcoholysis mixture containing 0.2% catalyst, and about 3 overlaps in the mixture containing 0.4% catalyst. Because overlapping is possible, adequate production rates can be maintained without the need for larger equipment than that used in operating the process described in U.S. Patent 2,734,048.

The preference of the catalyst for the solid phase also has a beneficial effect on the type of granulation produced by the process of this invention, and that is to increase the bulk density of the polyvinyl alcohol. Low bulk density, e.g. 0.2 g./cc., can be a factor contributing to the dustiness in polyvinyl alcohol. The particles when first formed by comminuting the gel structure which is obtained in this process are irregularly shaped, low bulk density materials. Because of the catalyst preference for the solid phase, these initially formed, low density solid particles provide a location of high catalytic activity. Any polymer solution which is adsorbed on or trapped within these particles, undergoes rapid alcoholysis due to the high catalyst concentration. It has been found that the polyvinyl alcohol produced in this manner is more dense than are the initially formed particles. In addition, it partially fills the voids in the original particles. Both of these factors cause the bulk density of the particles to increase as they remain in the alcoholysis mixture. Since increased methyl acetate forces more catalyst into the solid phase, this causes more polyvinyl acetate to alcoholize on or within the preformed particles thus raising the bulk density. It has been found that as much as 90% of the polymer fed in a given intermittent portion according to the process of this invention will alcoholize on preformed particles by the time the remainder of the portion is alcoholized in the solvent-soluble phase to the gel stage.

The intermittent feed process of this invention is easy to control. The size and frequency of the intermittent portions can be used to regulate particle size. Alkalinity and/or temperature can be used to control the production rate. The thickening of the alcoholysis mixture as the intermittent portions pass through the gel phase can be monitored by standard methods. For example, the speed of rotation of the agitator, the power required to turn the agitator, the torque on the agitator, viscosity determination, etc. can be used to provide a continuous measure of the condition of the alcoholysis mixture. Variations in the extent of thickening of the alcoholysis mixture as the intermittent portion pass through the gel phase can be used to control the size of the intermittent portions, the interval between the portions, the catalyst concentration or the temperature, and thereby keep the process under control. A preferred method of control is to operate at constant temperature, catalyst concentration and polymer feed interval, and vary the size of the intermittent portions to control the process. For example, in monitoring the alcoholysis mixture by measurement of the power requirements to agitate the mixture, an increase above the normal power requirement during gelation of an intermittent portion calls for a reduction in the size of the next intermittent portions. This may be readily accomplished by decreasing the feed time or by decreasing the rate of feed.

The ability of a monitoring system to detect thickening of the alcoholysis mixture and variations in the extent of thickening and to translate them into control of the size of the intermittent portions depends on the sensitivity of that system. As mentioned previously, it is necessary for the intermittent portions to cause periodic thickening of the alcoholysis mixture in order to obtain granulation according to this invention. Thickening which causes about a 1% increase in the power requirements can be readily detected. A 10% increase in the power requirements during the gel phase, e.g. from 20 kilowatts to 22 kilowatts, is sufficient to use the variations in power to control the size of the intermittent portions. More sensitive methods to monitor the thickening of the alcoholysis mixture will permit control with even smaller absolute variations in the viscosity of the alcoholysis mixture.

It has been found that even in alcoholysis mixtures in which there may be several overlappings of intermittent portions in the solvent-soluble phase, an adjustment of the size of the intermittent portion being fed will have an effect on the extent to which the alcoholysis mixture thickens during the first gel phase thereafter. This rapid response to corrective adjustments of the size of the intermittent portions provides easy and precise control of the alcoholysis process of this invention.

In the following examples, all percentages and parts are on a weight basis.

*Example 1*

A 1400 ml. alcoholysis kettle was equipped with a reflux condenser, inlet tubes for addition of polyvinyl acetate solution and sodium methylate solution, a discontinuous ribbon screw agitator powered by a 1 H.P. universal motor, and a top overflow tube leading to a 1400 ml. agitated vessel which served as a hold-up vessel. The speed of the universal motor was controlled in the 800–1400 r.p.m. range by means of a variable voltage transformer. The top end of the motor shaft was equipped with a speed reducer which drove a brushless generator. The voltage from the generator was reduced and fed to a continuously recording potentiometer. Changes in agitation power requirements changed the agitator r.p.m. and were recorded as corresponding voltage changes. This system was sufficiently sensitive to measure a change of 2 out of 1000 r.p.m. The hold-up vessel had a side overflow tube so positioned that the vessel operated at two thirds full. The effluent from the overflow tube was removed to batch finishing vessels. The alcoholysis vessel, hold-up vessel, and finishing vessels were maintained at elevated temperatures as indicated below.

Methanol containing 0.35% sodium methylate catalyst was placed in the alcoholysis kettle which was maintained at 55° C. A methanol solution of polyvinyl acetate (42% solids) was added in intermittent portions using smaller portions at first and finally building up to 11 g. portions fed in 8 seconds, followed by a non-feed interval of 82 seconds. It has been found that when starting an alcoholysis in methanol solution, the initial intermittent portions should be small. As the polyvinyl alcohol solids and methyl acetate build up in the alcoholysis mixture, the portions can be made larger because of the more rapid alcoholysis due to the increasingly large portion of alcoholysis occurring in the solid phase. As the methyl acetate increases to equilibrium concentration, the gel becomes weaker allowing a higher concentration of polymer to enter the gel phase, and the alcoholysis rate through the gel phase is faster permitting reduction in the time intervals between the intermittent portions. The intermittent feed process can also be started by changing the feed to an alcoholysis mixture being operated according to U.S. Patent 2,734,048 from continuous to intermittent. The intermittent portions should be relatively small at first in order to avoid formation of polyvinyl alcohol adhesions on the agitator and vessel walls due to the higher concentration of viscous gel phase. As the initially produced coarse particles grow and become more dense and hard by alcoholysis on their surfaces, they act to scour the vessel and agitator. The vessel can then be operated with larger intermittent portions without formation of adhesions, this in turn producing granules of increased size.

The catalyst concentration in the alcoholysis vessel was maintained at 0.35–0.45% during the entire run by continuous addition of a sodium methylate solution. The overflow from the alcoholysis vessel was led to the hold-up vessel which was maintained at 55° C. When the alcoholysis system reached steady state operation, the effluent from the hold-up vessel was collected in the finishing vessels and maintained at about 60° C. for ten minutes. The catalyst was neutralized with acetic acid, and the product polyvinyl alcohol then recovered by filtration and dried. The polyvinyl alcohol was found to contain only 3.5% material smaller than 325 mesh.

For comparison, the product obtained by alcoholysis of polyvinyl acetate (35% solution in methanol) at a catalyst concentration of 0.35% according to the process of U.S. Patent 2,734,048 contained 79% material smaller than 325 mesh. Moreover, most of the material smaller than 325 mesh from the intermittent feed process of Example 1 had particle sizes in the range of 30–45 microns. Most of the material smaller than 325 mesh from the process of U.S. Patent 2,734,048 was in the dusty 3–15 micron range.

The use of a hold-up vessel and finisher as in this example is conventional to prevent contamination of the polyvinyl alcohol by incompletely alcoholized material. The polyvinyl alcohol produced by the process of this invention contains less than 2%, and preferably less than 1%, of the original acetate groups in the polyvinyl acetate.

*Example 2*

An alcoholysis vessel with a length/diameter ratio of 11/8 and capacity of 3400 parts of 36% polyvinyl acetate solution in methanol was equipped with a flat-bladed paddle stirrer driven by a constant speed induction motor, a top overflow tube leading to an agitated hold-up vessel, and inlet tubes for addition of polyvinyl acetate solution and sodium methylate catalyst solution. The hold-up vessel had a capacity two thirds that of the alcoholysis vessel. It had an inlet tube for addition of sodium methylate solution and an automatic level controller which permitted the operation of the vessel at any desired level. For this run the hold-up vessel was operated two thirds full. The effluent from the hold-up vessel was led to a plug flow finisher and then to a catalyst neutralization zone. The product polyvinyl alcohol was recovered from the methanol-methyl acetate slurry by filtration and then dried.

The above-described apparatus was used to produce polyvinyl alcohol by the intermittent feed process using a 36% polyvinyl acetate solution. The temperature in the alcoholysis vessel was maintained at 56° C., and in the hold-up vessel and finisher at 53° C. The catalyst concentration in the alcoholysis vessel was maintained at 0.12% and in the hold-up vessel at 0.35%. When the process reached a steady operating condition, the feed cycle was 1 minute on, 2 minutes off, and the feed rate during the on portion of the cycle was 14 parts polyvinyl acetate/minute. The total feed of polyvinyl acetate per hour was 280 parts (780 parts of 36% polyvinyl acetate solution). The power requirements for agitation were monitored by measurement with a wattmeter. Variations in the power requirements were used to control the size of the intermittent portions so as to maintain the power rises at the desired magnitude. The power peaks were 8% greater than the power base.

The product polyvinyl alcohol was found to contain only 0.5% material smaller than 325 mesh.

*Example 3*

The process of Example 2 was repeated with the following modification in the feeding of the polyvinyl acetate solution: a continuous feed of 2.3 parts polyvinyl acetate/minute was added to the alcoholysis mixture and superimposed on this continuous feed was an intermittent feed cycle of 1 minute on, 4 minutes off. The total feed rate during the on portion of the intermittent feed cycle was 14 parts polyvinyl acetate/minute. The total feed of polyvinyl acetate per hour was 280 parts, as in Example 2. The product polyvinyl alcohol contained 0.5% material smaller than 325 mesh.

*Example 4*

The procedure of Example 3 was followed with the following modifications: concentration of polyvinyl acetate solution, 35%; catalyst concentration in alcoholysis vessel, 0.14%; continuous feed of 2.8 parts polyvinyl acetate/minute and superimposed on this continuous feed was an intermittent feed cycle of 1.5 minutes on, 1.8 minutes off. The total fed rate during the on portion of the intermittent feed cycle was 12 parts polyvinyl acetate/minute. The total feed of polyvinyl acetate per hour was 420 parts. The product polyvinyl alcohol contained 0.5% material smaller than 325 mesh. Its bulk density was 0.33 g./cc. compared with 0.39 g./cc. for the products obtained in Examples 2, and 3, and 0.44 g./cc. for the product of Example 1.

It is possible to operate a continuous process similar to that of U.S. Patent 2,734,048, except that it is carried out under a continuously thickened condition, and thereby to obtain a coarse product. The particle size can be relatively large if the vessel is operated at high power and the agitation is distributed to all parts of the vessel. Control of the process is difficult, however, and any deviation from the required conditions will either cause the alcoholysis mixture to set-up to a solid, gelled mass or else fine particles will be made. Moreover, the process gives low bulk density product which is dustier than high bulk density materials. In addition, an alcoholysis vessel being so operated rapidly becomes fouled with polyvinyl alcohol adhesions. In contrast, the process of this invention is easy to control, gives coarse, dense particles, does not require high powered mixing equipment, and avoids adhesion formation on the alcoholysis vessel and agitator.

I claim:
1. In a process for the production of polyvinyl alcohol by the catalyzed alcoholysis of a polyvinyl ester in which a solution of the polyvinyl ester in a hydrolytic alcohol is fed to an agitated alcoholysis mixture and a slurry of polyvinyl alcohol in a solvent mixture comprising said hydrolytic alcohol and the ester of said hydrolytic alcohol with the acid residue of the polyvinyl ester is removed from said alcoholysis mixture, said alcoholysis mixture consisting essentially of said polyvinyl ester, an alcoholysis catalyst, said hydrolytic alcohol, said ester of said hydrolytic alcohol and polyvinyl alcohol, the improvement comprising feeding at least a part of said polyvinyl ester solution in intermittent portions of such size that said alcoholysis mixture thickens as each said portion after its addition to said alcoholysis mixture passes through a gel phase, each such intermittent portion being of such size and being fed at such a rate that if such rate of feed were maintained continuously said alcoholysis mixture would set up to a non-moving gelled mass, the time interval between succeeding said portions being sufficient for said alcoholysis mixture to revert to a non-thickened condition after each said portion passes through the gel phase and before the next succeeding said portion passes into the gel phase, and recovering from said slurry of polyvinyl alcohol a substantially non-dusty granular polyvinyl alcohol.

2. In a process for the production of polyvinyl alcohol by the alkali-catalyzed alcoholysis of polyvinyl acetate in which a solution of polyvinyl acetate in methanol is fed to an agitated alcoholysis mixture and a slurry of polyvinyl alcohol in a methanol-methyl acetate solvent mixture is removed from said alcoholysis mixture, said alcoholysis mixture consisting essentially of polyvinyl acetate, an alkaline alcoholysis catalyst, methanol, methyl acetate and polyvinyl alcohol; the improvement comprising feeding at least a part of said polyvinyl acetate solution in intermittent portions of such size that said alcoholysis mixture thickens as each said portion after its addition to said alcoholysis mixture passes through a gel phase, each such intermittent portion being of such size and being fed at such a rate that if such rate of feed were maintained continuously said alcoholysis mixture would set up to a non-moving gelled mass, the time interval between succeeding said portions being sufficient for said alcoholysis mixture to revert to a non-thickened condition after each said portion passes through the gel phase and before the next succeeding said portion passes into the gel phase, and recovering from said slurry of polyvinyl alcohol a substantially non-dusty granular polyvinyl alcohol.

3. In a process for the production of polyvinyl alcohol by the alkali-catalyzed alcoholysis of polyvinyl acetate in which a solution of polyvinyl acetate in methanol is fed to an agitated alcoholysis mixture consisting essentially of polyvinyl acetate, sodium methylate alcoholysis catalyst, methanol, methyl acetate and polyvinyl alcohol, and a slurry of polyvinyl alcohol is continuously removed from said alcoholysis mixture, the improvement comprising feeding said polyvinyl acetate solution in intermittent portions of such size that said alcoholysis mixture thickens as each said portion after its addition to said alcoholysis mixture passes through a gel phase, each such intermittent portion being of such size and being fed at such a rate that if such rate of feed were maintained continuously said alcoholysis mixture would set up to a non-moving gelled mass, the time interval between succeeding said portions being sufficient for said alcoholysis mixture to revert to a non-thickened condition after each said portion passes through the gel phase and before the next succeding said portion passes into the gel phase, and recovering from said slurry of polyvinyl alcohol a substantially non-dusty granular polyvinyl alcohol.

4. In a process for the production of polyvinyl alcohol by the alkali-catalyzed alcoholysis of polyvinyl acetate in which a solution of polyvinyl acetate in methanol is fed to an agitated alcoholysis mixture consisting essentially of polyvinyl acetate, sodium methylate alcoholysis catalyst, methanol, methyl acetate and polyvinyl alcohol, and a slurry of polyvinyl alcohol is continuously removed from said alcoholysis mixture, the improvement comprising feeding at least a part of said polyvinyl acetate solution in intermittent portions of such size that said alcoholysis mixture thickens as each said portion after its addition to said alcoholysis mixture passes through a gel phase, each such intermittent portion being of such size and being fed at such a rate that if such rate of feed were maintained continuously said alcoholysis mixture would set up to a non-moving gelled mass, the time interval between feeding the individual said portions being greater than the sum of (1) the time required to feed an individual said portion and (2) the time during which an individual said portion is in the gel phase, and recovering from said slurry of polyvinyl alcohol a substantially non-dusty granular polyvinyl alcohol.

5. In a process for the production of polyvinyl alcohol by the catalyzed alcoholysis of a polyvinyl ester in which a solution of the polyvinyl ester in a hydrolytic alcohol is fed to an agitated alcoholysis mixture and a slurry of polyvinyl alcohol in a solvent mixture comprising said hydrolytic alcohol and the ester of said hydrolytic alcohol with the acid residue of said polyvinyl ester is removed from said alcoholysis mixture, said alcoholysis mixture consisting essentially of said polyvinyl ester, an alcoholysis catalyst, said hydrolytic alcohol, said ester of said hydrolytic alcohol and polyvinyl alcohol; the improvement comprising feeding at least a part of said polyvinyl ester solution in intermittent portions of such size that increased power is required to agitate said alcoholysis mixture as each said portion after its addition to said alcoholysis mixture passes through a gel phase, the time interval between succeeding said portions being sufficient for the power requirements for agitation to decrease to a base power load between intervals of increased power requirements, said increased power requirement being at least 8% greater than said base power load requirement, said base power load being the power required to agitate the non-thickened alcoholysis mixture, and recovering from said slurry of polyvinyl alcohol a substantially non-dusty granular polyvinyl alcohol.

6. In a process for the production of polyvinyl alcohol by the alkali-catalyzed alcoholysis of polyvinyl acetate in which a solution of polyvinyl acetate in methanol is fed to an agitated alcoholysis mixture and a slurry of polyvinyl alcohol in a methanol-methyl acetate solvent mixture is removed from said alcoholysis mixture, said alcoholysis mixture consisting essentially of polyvinyl acetate, an alkaline alcoholysis catalyst, methanol, methyl acetate and polyvinyl alcohol, the improvement comprising feeding at least a part of said polyvinyl acetate solution in intermittent portions of such size that increased power is required to agitate said alcoholysis mixture as each said portion passes through a gel phase, the time interval between succeeding said portions being sufficient for the power requirements for agitation to decrease to a base power load between intervals of increased power requirements, said increased power requirement being at least 8% greater than said base power load requirement, said base power load requirement, said base power load being the power required to agitate the non-thickened alcoholysis mixture, and recovering from said slurry of polyvinyl alcohol a substantially non-dusty granular polyvinyl alcohol.

7. A process for the production of polyvinyl alcohol by the catalyzed alcoholysis of a polyvinyl ester comprising feeding a solution of said polyvinyl ester in a hydrolytic alcohol to an agitated alcoholysis mixture consisting essentially of said polyvinyl ester, an alcoholysis catalyst, said hydrolytic alcohol, the ester of said hydrolytic alcohol with the acid residue of said polyvinyl ester and polyvinyl alcohol, said polyvinyl ester solution being fed in intermittent portions of such size that said alcoholysis mixture thickens as each said portion after its addition to said alcoholysis mixture passes through a gel phase, each such intermitent portion being of such size and being fed at such a rate that if such rate of feed were maintained continuously said alcoholysis mixture would set up to a non-moving gelled mass, the time interval between succeeding said portions being sufficient for said alcoholysis mixture to revert to a non-thickened condition after each said portion passes through the gel phase and before the next succeeding said portion passes into the gel phase, removing a slurry of polyvinyl alcohol in a solvent mixture comprising said hydrolytic alcohol and said ester thereof, and recovering from said slurry of polyvinyl alcohol a substantially non-dusty granular polyvinyl alcohol.

8. A process for the production of polyvinyl alcohol by the alkali-catalyzed alcoholysis of polyvinyl acetate comprising feeding a solution of said polyvinyl acetate in methanol to an agitated alcoholysis mixture consisting essentially of polyvinyl acetate, sodium methylate alcoholysis catalyst, methanol, methyl acetate and polyvinyl alcohol, said polyvinyl acetate solution being fed in intermittent portions of such size that said alcoholysis mixture thickens as each said portion after its addition to said alcoholysis mixture passes through a gel phase, each such intermittent portion being of such size and being fed at such a rate that if such rate of feed were maintained continuously said alcoholysis mixture would set up to a non-moving gelled mass, the time interval between succeeding said portions being sufficient for said alcoholysis mixture to revert to a non-thickened condition after each said portion passes through the gel phase and before the next succeeding said portion passes into the gel phase, removing a slurry of polyvinyl alcohol in a methanol-methyl acetate solvent mixture, and recovering from said polyvinyl alcohol slurry a substantially non-dusty granular polyvinyl alcohol.

References Cited by the Examiner

UNITED STATES PATENTS

| | | | |
|---|---|---|---|
| 2,642,420 | 6/1953 | Kenyon | 260—91.3 |
| 2,734,048 | 2/1956 | Bristol et al. | 260—91.3 |
| 2,779,752 | 1/1957 | Vining | 260—91.3 |

WILLIAM H. SHORT, *Primary Examiner.*

LOUISE P. QUAST, *Examiner.*